May 19, 1970
R. L. PERKINS ET AL
3,512,253
METHOD FOR SIMULTANEOUSLY MAKING A PLURALITY OF FLYING HEADS
Filed March 22, 1968
4 Sheets-Sheet 1
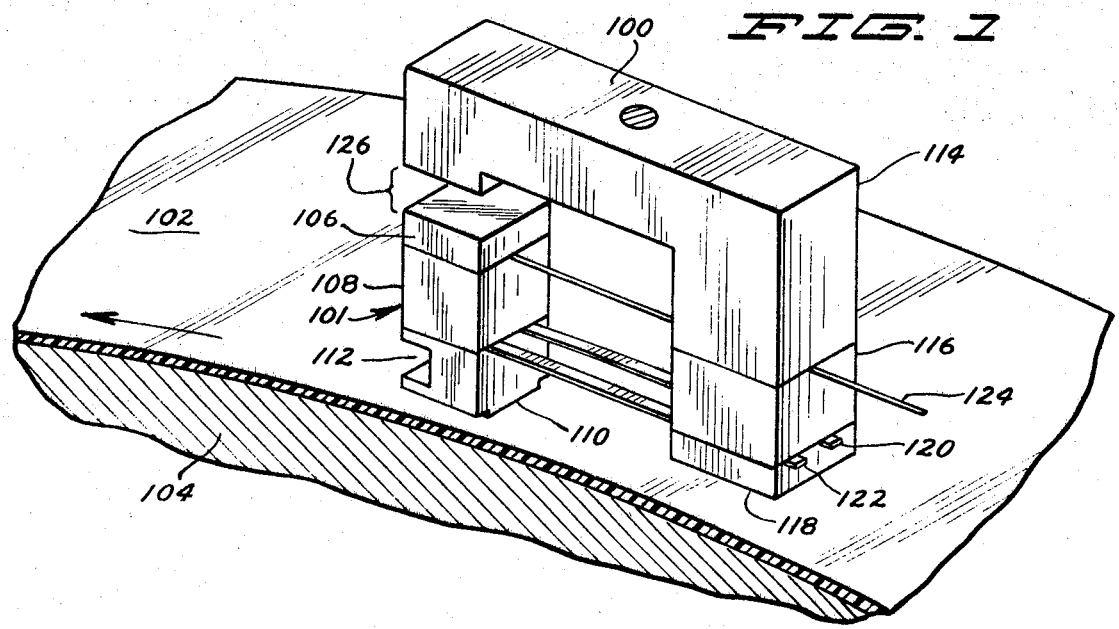
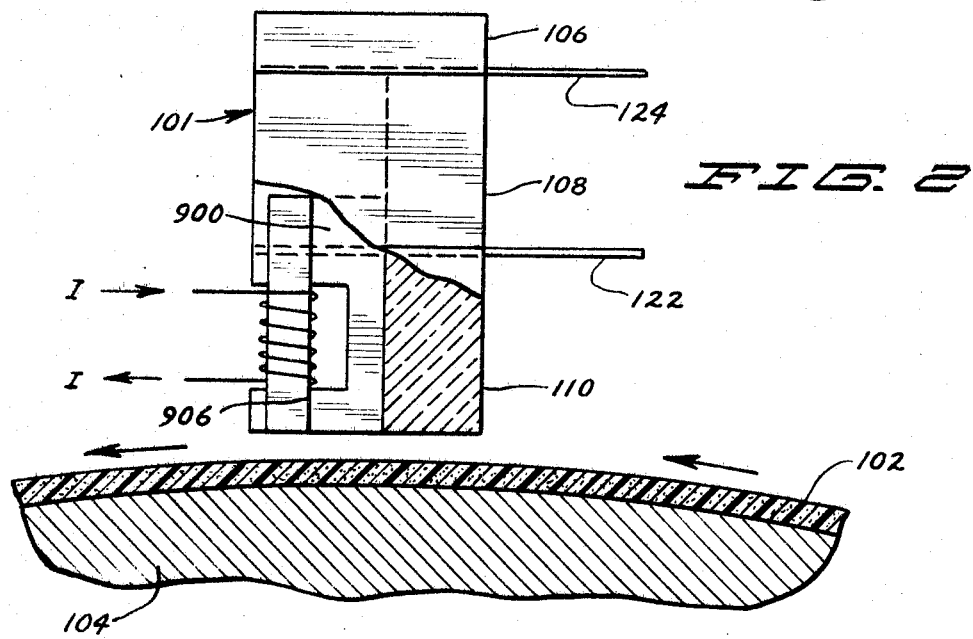
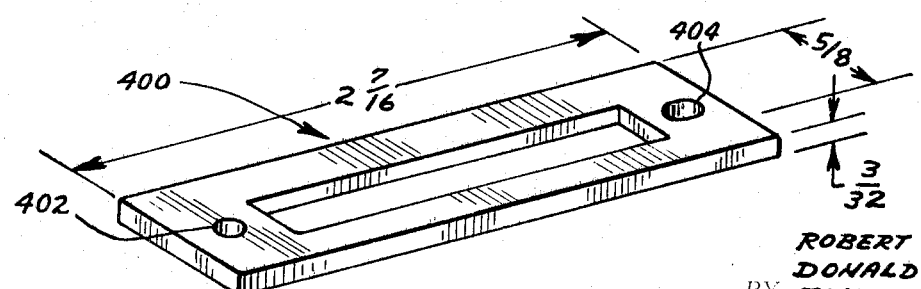
INVENTORS
ROBERT L. PERKINS
DONALD C. RASMUSSEN
JOHN W. ELSING
BY Bruce A. Nemer
AGENT

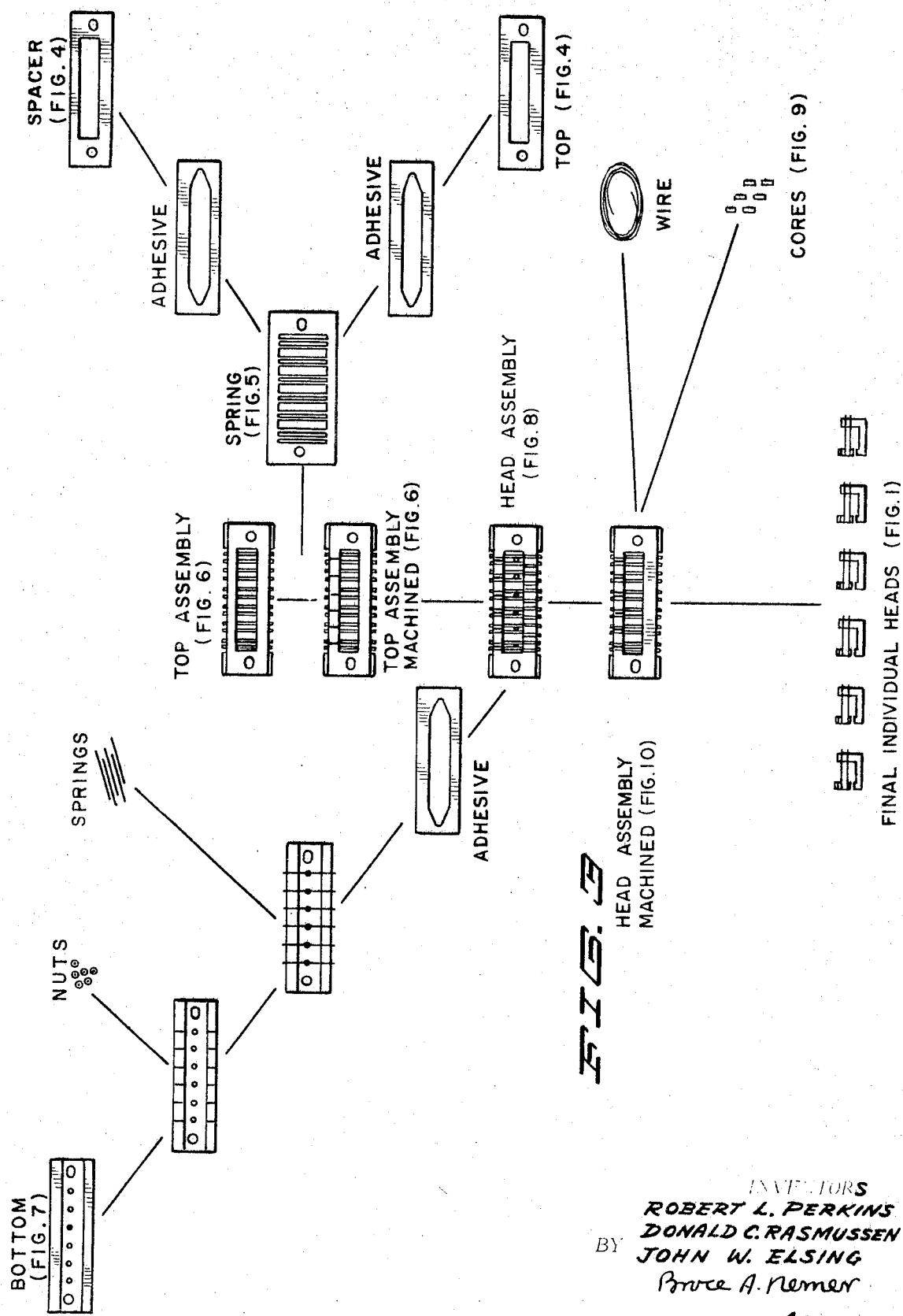

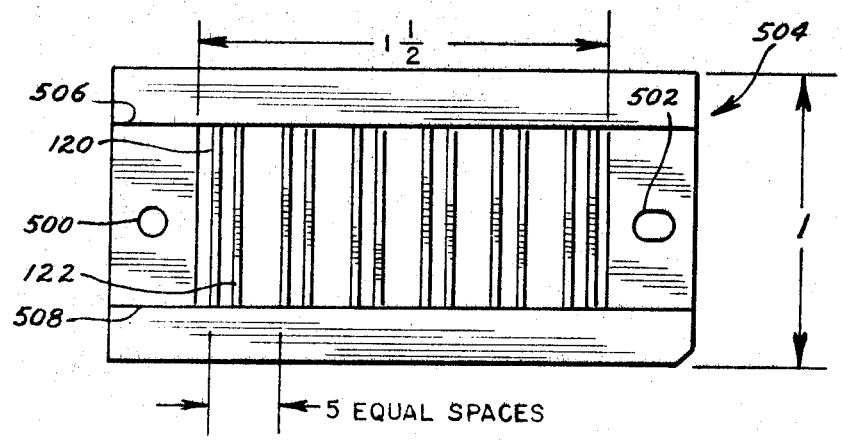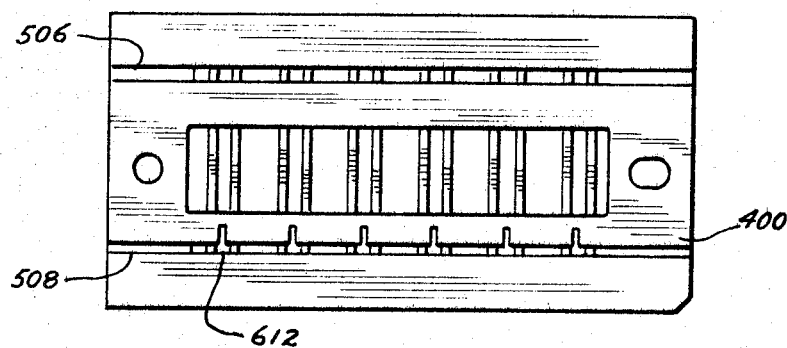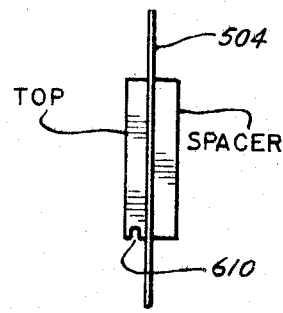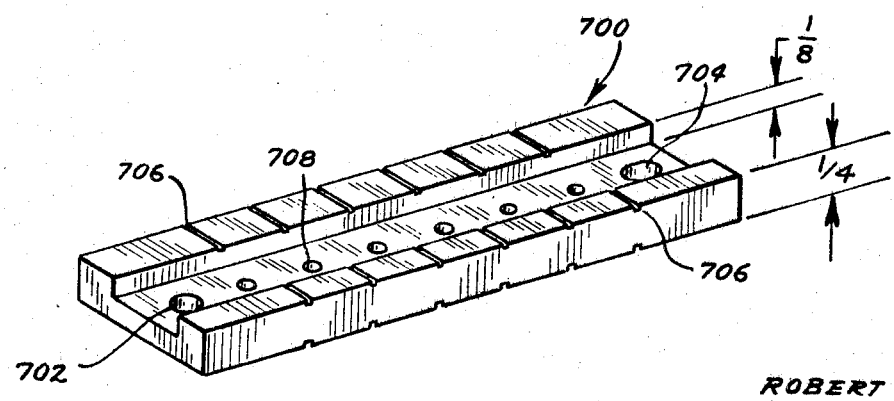

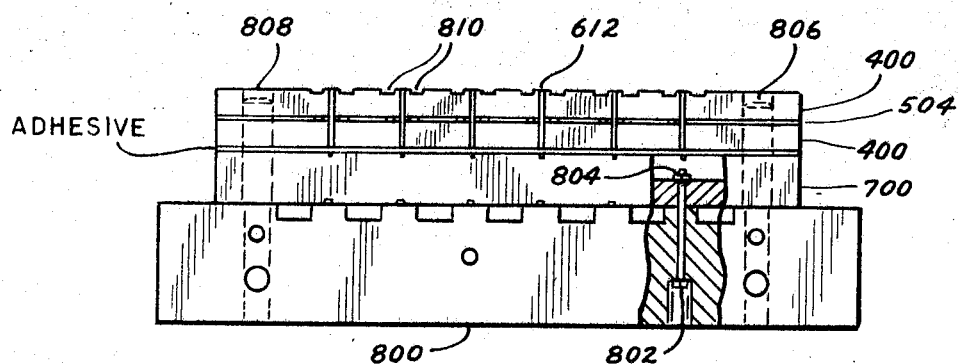
FIG. 8
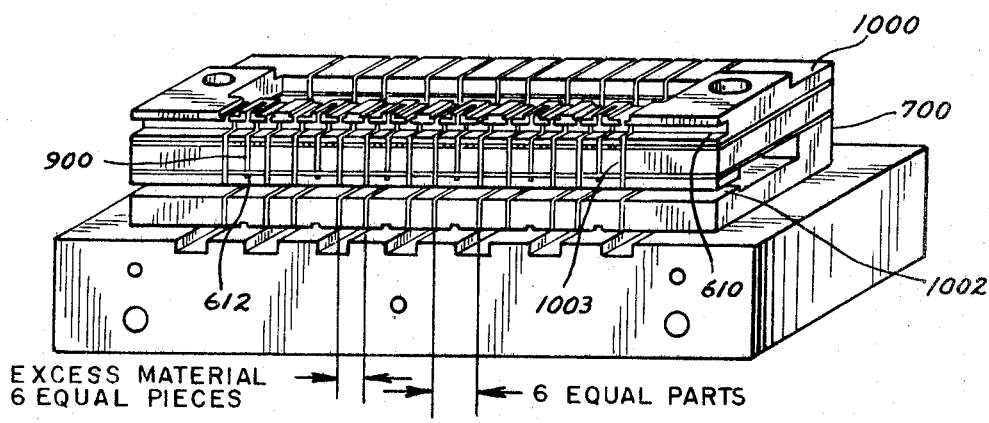
FIG. 10A
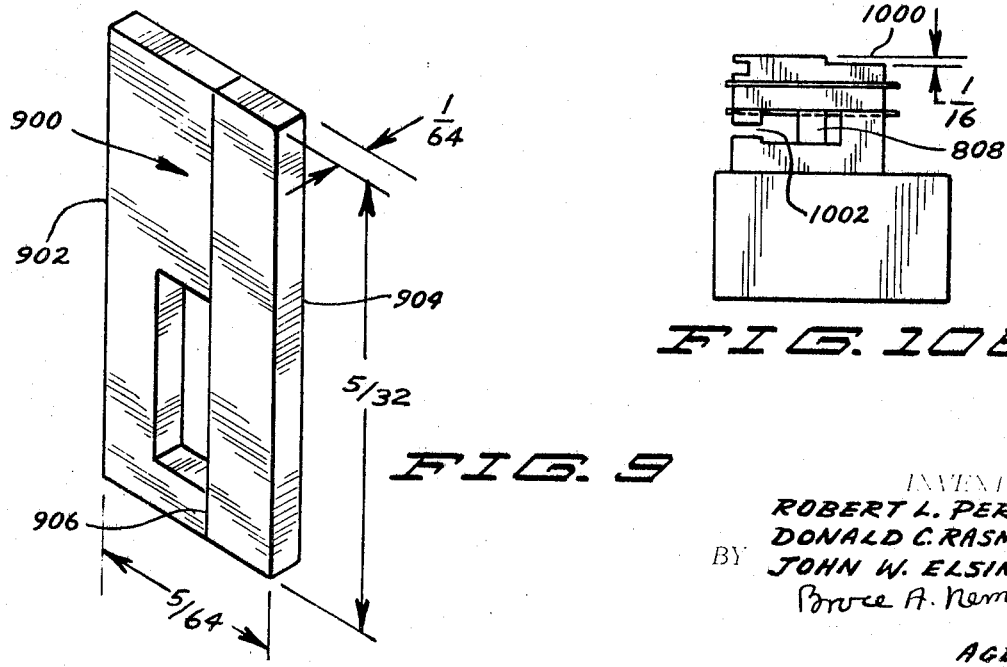
FIG. 10B
FIG. 9
INVENTORS
ROBERT L. PERKINS
DONALD C. RASMUSSEN
JOHN W. ELSING
BY Bruce A. Nemer
AGENT United States Patent Office 3,512,253
Patented May 19, 1970

3,512,253
METHOD FOR SIMULTANEOUSLY MAKING A PLURALITY OF FLYING HEADS
Robert L. Perkins, St. Paul, John W. Elsing, Edina, and Donald C. Rasmussen, Minnetonka, Minn., assignors to Control Data Corporation, South Minneapolis, Minn., a corporation of Minnesota
Filed Mar. 22, 1968, Ser. No. 715,417
Int. Cl. H01f 7/00
U.S. Cl. 29—603
12 Claims

ABSTRACT OF THE DISCLOSURE

A method for simultaneously making a number of flying heads for a magnetic drum system is disclosed. All types of preliminary parts are first made—one type of preliminary part for each type of individual head part. Each preliminary part accommodates a number of individual head parts of the same type. The preliminary parts are then: assembled to form several rough individual heads fixed to each other; machined to form final individual heads still fixed to each other; and finally cut apart to form separate individual heads.

BACKGROUND

It is well known in the art that a flying head must be well aligned with the moving surface upon which it is supported. If the head is not well aligned with the moving surface, contact between the moving surface and the head will damage both, and signals from the heads will not be uniform.

Alignment of a flying head is strongly affected by the flatness and parallelism tolerances of its component parts and by the alignment of the spring supporting the flying portion. Prior art fabrication techniques have relied principally on human judgment and skill to obtain good component parts. Human skill and judgment have proven inadequate, however, to economically fabricate the sophisticated flying heads required by modern memory systems. The present invention solves this problem.

The present invention teaches a method for fabricating flying heads allowing the use of tooling and machine processing. Thus, critical features of the flying head may be controlled by mechanical means rather than by relying on human judgment and skill, as in the prior art. The present invention also teaches the construction of flying magnetic heads with flatness and parallelism tolerances beyond the state of the art currently possible and with spring alignments better than previously possible. Additionally, the method of the present invention allows generally faster, more economical, and more accurate fabrication of flying magnetic heads.

DESCRIPTION

It is an object of the present invention to teach an economical method of fabrication for flying heads.

It is also an object of the present invention to increase the dimensional accuracy of the final flying head.

It is a further object of the present invention to provide a flying head of greater component part flatness and parallelism than heretofore possible.

It is still a further object of the present invention to provide a flying head with superior spring alignment than heretofore possible.

These and further objects and advantages of the present invention will become clearer in the light of the following detailed description of an illustrative embodiment of invention and from the appended claims.

The illustrative embodiment may best be described with reference to the accompanying drawings where:

FIG. 1 shows a representation of a flying magnetic head and its relative position with respect to a moving recording surface.

FIG. 2 shows a side view of the flying portion of the flying magnetic head of FIG. 1 in relation to the moving surface.

FIG. 3 shows a preferred procedure for practicing the present invention.

FIGS. 4 through 10, more clearly show the piece parts illustrated within FIG. 3.

FIG. 1 shows an individual flying head generally designated as 100 having a flying portion generally designated as 101 situated above a recording surface 102 of a magnetic drum 104.

In FIG. 2, the relationship between the flying portion or member 101 of magnetic head 100 and the surface 102 is better shown. As the magnetic drum 104 which supports surface 102 rotates in the counter-clockwise direction shown, a wedge of air is forced beneath the surface of flying member 101 closest to surface 102. Member 101 rides on or "flies" on this moving current of air and is supported slightly above the rotating surface 102 of magnetic drum 104. Surface 102, in the preferred embodiment, is a nickel cobalt film which can be magnetized by the application of current to a core, generally designated as 900 and shown within flying member 101. Flux caused by the application of current to windings on core 900 will pass around the circular path offered by core 900 until the gap 906 between two pieces forming core 900 is reached. The gap impedes the passage of flux; therefore, the flux passes out of the core and through the nickel cobalt surface film 102 of magnetic drum 104. Since a current pulse is applied and withdrawn in a short period of time, a small given area on surface 102 may be magnetized in spite of the fact that surface 102 is moving.

OPERATIONS

The steps comprising the method of the present invention are generally shown in FIG. 3. Figure numbers associated with the various steps shown refer to more exact representations of the piece parts in subsequent figures.

Generally then a spacer, dimensionally show in FIG. 4, is attached to one major surface of a spring, dimensionally shown in FIG. 5, by means of a configured strip of heat and pressure sensitive adhesive. A top, also dimensionally shown in FIG. 4, is attached to the other major surface of the spring by another configured strip of adhesive. The composite of the top, the adhesive, the spring the adhesive, and the spacer is generally shown as the top assembly of FIGS. 6A and 6B. Parallel to the fabrication of the top assembly, a bottom, as dimensionally shown in FIG. 7, is prepared. First, nuts are attached to holes in the bottom so that the bottom may be firmly affixed to a working fixture. Next spring wire is placed in solts formed in the bottom. The bottom including the nuts and spring wire is then fixed to the top assembly by still another strip of adhesive. The total assembly formed at this point is known as the head assembly and is shown in FIG. 8. The head assembly is then machined as shown in FIG. 10 and cut apart to form the final individual heads generally shown as magnetic head 100 in FIG. 1.

More particularly, FIG. 4 shows a dimensioned representation 400 of either the top or the spacer shown in FIG. 3. The dimensions are in inches. A circular alignment hole 402 and an oblong alignment slot 404 can be seen. These and other alignment guides are used throughout the assembly procedure of the present invention to assure proper alignment between the parts. That the method of the present invention allows the use of alignment guides is one of its advantages, as will become clear as the method is explained.

FIG. 5 shows alignment guides 500 and 502 within a spring member 504. Guides 500 and 502 are dimensionally identical to alignment guides 402 and 404 of FIG. 4 and serve the same purpose. Spring 504 is formed by etching a suitable spring material, many of which are well known to those skilled in the art.

The etching forms the individual flat spring members used to support flying member 101 within FIG. 1. For example the flat spring members shown as 120 and 122 within FIG. 1 are also designated as 120 and 122 within FIG. 5.

After the top, the spacer, the spring, and the two configured adhesive strips are fabricated to the dimensions indicated, they are assembled on a fixture having pin projections dimensionally matching those of alignment guides 402 and 404, alignment guides 500 and 502 and the alignment guides within the configured adhesive strips. The spacer is first placed on the projections of the fixture. An adhesive strip is then placed over the spacer followed by spring 504, another adhesive strip, and the top. An upper fixture is placed over the entire assembly, and head and pressure are applied to cause the adhesive to bond the parts together.

The top assembly shown in FIGS. 6A and 6B is now completed. Referring to FIG. 6B, spring member 504 may be seen between the spacer and the top, both dimensionally shown in FIG. 4. The top assembly shown in FIGS. 6A and 6B is then prepared for machining. First, the excess material of spring member 504 beyond lines 506 and 508 is broken off. Lines 506 and 508 are etched into spring 504 so that a few bends of the excess material beyond these lines will cause a break at these lines. After the excess spring material is removed, groove, channel, or slot 610, shown in FIG. 6B, is cut into the top assembly. Next, identically spaced slots 612 are cut into the side of the top assembly. Groove 610 and slots 612 are later used for placing and winding the ferrite cores 900.

An important advantage of the present invention can now be explained. Each individual flat spring, such as spring 120 or 122 of FIG. 1 is dimensionally on the order of 700 mils long by 30 mils wide and a few mils thick. It is easily appreciated that a piece of metal this small is difficult to handle. Since the flat springs play an important role in maintaining the positional integrity of the flying member 101 shown within FIG. 1, the flatness of each individual spring is of critical importance. Thus any bends or distortions caused by handling such a small spring detrimentally affects the final positioning of flying member 101. Using the teachings of the present invention, however, these individual flat springs are never directly handled. Notice that all handling occurs along the edges of spring member 504—the individual springs are not handled. Notice also that the handled portion of spring member 504 is discarded. Thus, the composite forming of several flying magnetic heads has its first advantage in preventing distortion of the individual flat springs shown as 120 and 122 supporting flying member 101 in FIG. 1.

Forming the individual flat springs as a composite spring member 504 also has another significant advantage. The individual spring may be fabricated with an initial flatness and thickness uniformity greater than allowed by current state of the art fabrication techniques. Individual spring flatness and piece to piece spring thickness also affect the positional integrity of the flying member 101 shown within FIG. 1. If composite spring member 504 is held to the minimum flatness and parallelism error allowable by current fabrication techniques, the individual flat spring members will have a flatness and parallelism error which is less than the minimum. The individual flat springs will have less error than is possible by current fabrication techniques because the flatness and parallelism error appearing across a portion of composition spring member 504 such as is occupied by an individual flat spring 120 will be only a portion of the total parallelism and flatness error of the total spring member 504. That is, if spring member 504 is held to a maximum flatness error of 0.1 mil over its 1.5 inch length, an individual spring member measuring approximately 30 mils will have a flatness error of 30 divided by 1500 multiplied by the 0.1 total flatness error. Thus, an individual spring member will have approximately 1/50 of the total flatness error of 0.1 mil. Then, if the current fabrication state of the art dictates that a flatness error of 0.1 mil is the minimum obtainable, fabrication flying magnetic heads according to the teachings of the present invention allows a 50 times reduction in this flatness error for each individual spring. The manner in which the present invention maintains the piece to piece thickness uniformity of the individual springs may be similarly explained.

As previously stated, the bottom, shown in FIG. 3, is fabricated in a parallel process with the top assembly. A bottom 700 is shown in FIG. 7. Alignment guides 702 and 704 are shown which are dimensionally identical to alignment guides 402 and 404 of FIG. 4, alignment guides 500 and 502 of FIG. 5, and the aligment guides of the glue patterns. Six identical slots 706 are shown for receiving the wire spring shown as 124 in FIG. 1. Six identical holes 708 are shown for mounting the nuts which will attach the final assembly to a fixture for ease of machining, as will be explained. Holes 708 are also used later to mount the finished flying heads in a magnetic drum system. In preparing bottom 700, it is first machined to the dimensions given in FIG. 7; nuts are applied to holes 708; and slots 706 are machined.

At this point the head assembly of FIG. 8 may be fabricated. First, bottom 700 is bolted to a fixture 800 by means of 6 bolts 802 which pass through the 6 identical nuts 804 previously attached to bottom 700. By this means bottom 700 and the total resulting head assembly is firmly affixed to fixture 800 for further machining. Fixture 800 also has pin projections 806 and 808 which are dimensional matched to alignment guides 402 and 404, alignment guides 500 and 502, alignment guides 702 and 704, and the alignment guides of the patterned adhesive. The 6 identical round metal springs, shown as spring 124 within FIG. 1, are next placed in the slots 706 of bottom 700. The round springs are of similar material to that of spring 504 of FIG. 5. Another pattern of pressure and heat sensitive adhesive is then placed over projections 806 and 808 upon bottom 700. The top assembly of FIG. 6 is also placed upon alignment projections 806 and 808 over the glue pattern. The application of heat and pressure bonds bottom 700 to the top assembly and forms the completed head assembly shown in FIG. 8. The complete head assembly is then rough machined to approximate final dimensions in preparation for further machining and installation of the cores 900.

The first machining has already been done at this point. Twelve slots 810, shown in FIG. 8, have already been cut into the top assembly shown in FIG. 6. The slots 810 are cut immediately adjacent core slots 612. Slots 810 trim the flying pad shown as member 110 of FIG. 1 so that only a portion of the flying pad near the core will project towards surface 102.

Next, the cores shown in FIG. 9 are placed within slots 612 shown in FIG. 8. FIG. 9 shows a core generally designated as 900 having a C portion 902 and an I portion 904. The gap 906 between the C and the I sections is the restriction which causes the flux in the core to travel through surface 102 of FIGS. 1 and 2, as previously explained.

The complete head assembly of FIG. 8 including the installed cores is then machined to its final dimensions and the cores 900 are wound. Cores 900 are wound by passing wire through the opening in the C portion 902 of core 900. Slot 610 is seen to aid the winding of cores 900 by partially guiding the wires through the core opening. A center-tapped winding is made so that areas of surface 102 of FIG. 1 may be magnetized in either of two directions. Electrical connections to the center-tapped core winding are made through springs 120, 122, and 124 shown in FIG. 1.

The completed head assembly of FIG. 8 is then further machined so as to appear as the head assembly machined in FIGS. 10A and 10B. First, a step cut 1000 is made. The effect of step cut 1000 can be seen with reference to FIG. 1.

Member 118 is shorter than member 110, or explained another way, member 110 extends closer to surface 102 than does member 118 because of step cut 1000. Step cut 1000 thus helps to prevent any possible contact between member 118 and surface 102. It is imperative that a portion of member 110 near core 900 be as close as possible to surface 102 for the best magnetization of surface 102; however, it is not necessary that member 118 be close to surface 102. So, step cut 1000 is made.

Next, cut 1002 shown in both FIGS. 10A and 10B is made in bottom 700. Cut 1002 is the cut which eventually frees the flying portion 11 of magnetic head 100 of FIG. 1 and causes flying member 101 to be supported solely by springs 120, 122, and 124. It is seen, however, that cut 1002 does not free the individual flying members at this point because material of the common members holds what becomes flying member 101 in a fixed relation.

A bar is then placed in cut 1002 to avoid any possible stress to the spring members, and the individual heads are cut apart by cuts 1003, as shown in FIG. 10A. That is, the excess material of all common members is cut away, and a flying magnetic head 100 such as shown in FIG. 1 results.

Another important feature of the method taught by the present invention may now be explained. Notice that all machining to this point has taken place with the springs firmly fixed in their places. In the prior art where heads are singly constructed, machining is done upon a magnetic head after the spring member is supporting the flying member. From the previous discussion giving the importance of maintaining the positional integrity of the flying member of the flying magnetic head, it is easily seen that machining a magnetic head while the flying member is supported solely by its associated spring members can distort the spring members. This cannot happen using the teaching of the present invention because: all machining is done before cuts 1002 and 1003 are made; after cut 1002 is made, material of the common members still hold all parts fixed; and after cut 1003 is made even if accidental pressure is put upon the final head assembly to cause the opposite sides of cut 1002 to touch, the thickness of the cut is such that the individual spring members will not be over stressed. That is, the height of groove 1002 is such that the flexure of the spring members to close groove 1002 cannot overstress them.

Referring again to FIG. 1, members 106 and 114 originate from bottom 700 of FIG. 7. Members 108 and 116 originate from the spacer shown in FIG. 4. Members 110 and 118 originate from the top also shown in FIG. 4. Gap 126 between members 106 and 114 is caused by cut 1002. The notched shape of member 110 is caused by cuts 810. The lessor dimension of member 118 as compared to member 110 is caused by step cut 1000. And, groove 112 is caused by groove 610 first shown in FIG. 6B.

The advantages of the teachings of the present invention have now been clearly set out. The use of preliminary parts or common members each accommodating a number of individual head parts of the same type—such as bottom 700 which is a common bottom and accommodates a number of individual bottom members, spacer and top 400 each accommodating a number of individual spacer and top members and spring 504 accommodating a number of individual spring members—yields the following advantages: a number of heads are simultaneously made thus decreasing the fabrication time; good tolerances are automatically maintained since alignment guides are provided in the excess material of each common member which is ultimately removed; flatness and thickness of all parts can be more closely controlled; and spring flatness can be much more closely controlled because of lack of handling and the increased minimum flatness, parallelism, and thickness tolerances obtainable by common fabrication.

It is realized by those skilled in the art that the flying magnetic head 100 shown in FIG. 1 must be appropriately mounted proximate a magnetic drum. The view shown as FIG. 1 does not indicate a final mounting, which is familiar to those skilled in the art, but is intended to show the relationship between parts and the basic relationship between the flying head and the magnetic drum.

Now that the basic teachings of the present invention have been explained, many extensions and variations will be obvious to one skilled in the art. For example, many types of materials may be used for the various common members.

Additionally, the order of many of the machining steps may be changed consonant with the teachings of the method of the present invention.

Further, many techniques may be used to perform the exact steps outlined once the method of the present invention is understood.

Furthermore, variations in requirements may dictate a variation in the configuration of the final magnetic head. It is envisioned that many configurations of magnetic heads may be fabricated using the teachings of the method of the present invention.

Likewise, while the simultaneous fabrication of six flying heads has been illustrated, no limitation to this number is intended.

The preferred embodiment of the present invention is described for illustrative purposes only; no limitation is intended. Many variations will be obvious to one skilled in the art. It is desired that the present invention be limited only by the appended claims in which it is intended to cover the full scope and spirit of the present invention.

What is claimed is:

1. A method of simultaneously constructing a plurality of individual flying magnetic heads for a memory system, comprising the steps of:
    (a) fashioning a common lower member having sufficient dimension to accommodate a plurality of individual head lower members held in fixed relation by excess material of the common member and having at least one alignment guide in the excess material of the common member for exact positioning respects other common members;
    (b) fashioning a common upper member having sufficient dimension to accommodate a plurality of individual head upper members held in fixed relation by excess material of the common member and having at least one alignment guide in the excess material of the common member for exact positioning respects other common members;
    (c) fashioning a common spring member having sufficient dimension to accommodate a plurality of individual head spring members held in fixed relation by excess material of the common member and having at least one alignment guide in the excess material of the common member for exact positioning respects other common members;
    (d) joining the common lower member, common upper member, and common spring member according to the alignment guides for forming a composite member comprising a plurality of individual heads held in fixed relation by the excess material of the common members;

(e) forming apertures for magnetic cores in the lower member;
(f) placing magnetic cores in the apertures;
(g) placing windings on the magnetic cores;
(h) forming a common flying member by separating a portion of the lower member from the remaining members, the excess material of the common members holding the common flying member in fixed relation and limiting the flexure of the spring member for avoiding the overstressing of the spring member; and
(i) separating the individual magnetic heads by removing at least a portion of the excess material of each common member, the flying member of each individual magnetic head becoming supported only by its associated individual spring member.

2. The method of claim 1, wherein at least one aperture is fashioned within each common member for providing the alignment guide.

3. The method of claim 1, wherein a first aperture having a first configuration is fashioned within each common member for providing a first alignment guide and a second aperture having a second configuration is fashioned within each common member for providing a second alignment guide.

4. The method of claim 3, wherein step (d) comprises joining the common members according to the constraints imposed by the first and the second configurations of alignment guides.

5. The method of claim 4, wherein step (d) comprises joining the common members according to the alignment guides by passing first and second projections through first and second holes forming the first and second apertures, the projections being positioned for passing through the alignment guides in but a single orientation, each common member conforming to a preset positional relation as respects each other common member.

6. The method of claim 1, wherein the excess material of each common member includes the border of the common member.

7. The method of claim 1, wherein step (i) comprises separating the individual magnetic heads by removing at least a portion of the excess material of each common member between the individual heads.

8. A method for simultaneously constructing a plurality of flying heads including a support member, a spring member, and a flying member where the spring member is attached between the support member and the flying member to support the flying member with respect to the support member, comprising:
(a) forming a plurality of common members, one for each type of member of the individual flying head, each common member comprising a plurality of individual head members of a like type held in a fixed relation by excess material of the common member, each common member having at least one alignment guide formed within it for positioning;
(b) assembling all common members according to the alignment guide to form a plurality of individual heads, each spring member and each flying member being held in a fixed relationship by the excess material of the common members; and
(c) removing at least a portion of the excess material of each common member, the individual heads becoming separated and each individual flying member now becoming supported only by an individual spring member.

9. The method of claim 8, wherein the excess material of each common member comprises the border of the common member and material between individual head members.

10. The method of claim 8, wherein step (c) further comprises:
(aa) removing at least a portion of the excess material for partially freeing the individual head flying members from the remaining individual head members, the individual head flying members remaining held in a fixed relationship allowing only a limited flexure of the spring member by the remaining excess material of the common members; and
(bb) removing at least a portion of the excess material between the individual heads for separating the individual heads and for freeing each flying member.

11. The method of claim 8, wherein the alignment guides further comprise apertures formed within each common member.

12. The method of claim 8, wherein the alignment guides formed within each common member further comprise at least one aperture of a first shape and at least one aperture of a second shape for uniquely positioning the common members respects each other.

References Cited

UNITED STATES PATENTS

| 2,650,957 | 9/1953 | Cohen. | |
|---|---|---|---|
| 3,177,495 | 4/1965 | Felts | 346—74 |
| 3,460,244 | 8/1969 | Metz | 29—603 |

CHARLIE T. MOON, Primary Examiner

C. E. HALL, Assistant Examiner

U.S. Cl. X.R.

29—411, 630, 418; 179—100.2